US011952808B2

(12) United States Patent
Reichheld et al.

(10) Patent No.: US 11,952,808 B2
(45) Date of Patent: Apr. 9, 2024

(54) DEVICE FOR LOCKING AND/OR UNLOCKING A MOTOR VEHICLE OPENING PANEL, VEHICLE COMPRISING SAID DEVICE AND METHOD FOR LOCKING OR UNLOCKING A MOTOR VEHICLE OPENING PANEL USING SAID DEVICE

(71) Applicants: NOVARES FRANCE, Clamart (FR); COMMISSARIAT A L'ENERGIE ATOMIQUE ET AUX ENERGIES ALTERNATIVES, Paris (FR)

(72) Inventors: Frédérick Reichheld, Menton (FR); François Bollier, Nice (FR); Christophe Cazes, Versailles (FR); Lamine Benaissa, Massy (FR); Jean-Sébastien Moulet, Chambery (FR)

(73) Assignees: NOVARES FRANCE, Clamart (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 199 days.

(21) Appl. No.: 17/622,203

(22) PCT Filed: Jun. 22, 2020

(86) PCT No.: PCT/FR2020/051079

§ 371 (c)(1),
(2) Date: Dec. 22, 2021

(87) PCT Pub. No.: WO2020/260812

PCT Pub. Date: Dec. 30, 2020

(65) Prior Publication Data

US 2022/0349221 A1 Nov. 3, 2022

(30) Foreign Application Priority Data

Jun. 24, 2019 (FR) ...................................... 1906774

(51) Int. Cl.
*E05B 81/78* (2014.01)
*E05B 85/16* (2014.01)

(52) U.S. Cl.
CPC .............. *E05B 81/78* (2013.01); *E05B 85/16* (2013.01)

(58) Field of Classification Search
CPC .......... E05B 81/78; E05B 85/16; E05B 17/10; E05B 81/76; E05B 81/77; E05B 85/10; E05B 79/22
See application file for complete search history.

(56) References Cited

U.S. PATENT DOCUMENTS

2008/0079537 A1* 4/2008 Touge ..................... E05B 81/78 340/5.72

FOREIGN PATENT DOCUMENTS

DE 102012107189 A1 1/2014
EP 3088641 A1 11/2016

(Continued)

OTHER PUBLICATIONS

International Search Report dated Oct. 27, 2020 re: Application No. PCT/FR2020/051079, pp. 1-3, citing: EP 3088641 A1, JP 3812592 B2, DE 102012107189 A1, WO 2015055788 A1, WO 2004027832 A2 and JP 2017172140 A.

(Continued)

*Primary Examiner* — An T Nguyen
(74) *Attorney, Agent, or Firm* — Oliff PLC

(57) ABSTRACT

A device and a method for locking and/or unlocking a motor vehicle opening panel and vehicle having the device. The device includes a detection wall having an inner side and an opposite outer side, the outer side forming a contact detec- (Continued)

tion region, and a detection component arranged against the inner side for detecting contact between a user's finger or hand and the outer side. The detection component includes a sensor having a layer of a piezoelectric material which has surface undulations in the form of ridges. The layer of piezoelectric material is configured to detect predetermined contact on the outer side with a view to controlling the locking or unlocking of the opening panel.

10 Claims, 4 Drawing Sheets

(56) References Cited

FOREIGN PATENT DOCUMENTS

| | | | |
|---|---|---|---|
| JP | 3812592 | B2 | 8/2006 |
| JP | 2017172140 | A | 9/2017 |
| WO | 2004027832 | A2 | 4/2004 |
| WO | 2015055788 | A1 | 4/2015 |

OTHER PUBLICATIONS

Feb. 11, 2023 Office Action issued in Chinese Patent Application No. 202080046639.7.

* cited by examiner

DEVICE FOR LOCKING AND/OR UNLOCKING A MOTOR VEHICLE OPENING PANEL, VEHICLE COMPRISING SAID DEVICE AND METHOD FOR LOCKING OR UNLOCKING A MOTOR VEHICLE OPENING PANEL USING SAID DEVICE

TECHNICAL FIELD

The present disclosure concerns a device for locking and/or unlocking a door leaf of a motor vehicle.

BACKGROUND

Conventionally, door opening control devices comprise a capacitive sensor intended to detect a contact between a hand of a user and a detection area in order to control unlocking or locking of the door of the vehicle. These capacitive sensors are generally associated with a user identification system making it possible to remotely identify an authorized user.

Nevertheless, the capacitive sensors used for the control of unlocking or locking of vehicle doors sometimes have detection problems when the contact between the hand of the user and the detection area does not occur under optimal detection conditions.

Thus, the detection, and consequently the unlocking and locking of the door(s) of the vehicle, find it hard to take place when the user is wearing a glove or when the detection area is wet by rain or covered by frost.

SUMMARY

The present disclosure aims to overcome this drawback by proposing a locking and/or unlocking device making it possible to reliably lock or unlock a motor vehicle door leaf regardless of weather conditions and whether or not gloves are worn by the user.

To this end, the present disclosure relates to a device for locking and/or unlocking a motor vehicle door leaf, the device comprising a detection wall having an inner face and an opposite outer face, the outer face forming a contact detection area, and a detection member arranged against the inner face for detecting a contact between a finger or a hand of a user and said outer face, wherein the detection member comprises a sensor with a layer of a piezoelectric material having surface undulations in the form of ridges, said layer of piezoelectric material being configured to detect a predetermined contact on the outer face for controlling, depending on the predetermined detected contact, the locking or unlocking of the door leaf.

Thus, the device according to the disclosure makes it possible to detect and identify a complex movement, of the sliding type, as well as its orientation (upwards, downwards, to the right or to the left) or tap, as well as its duration or frequency (single or double, for example), among several possibilities, in order to control the execution of the associated function, particularly the locking or unlocking of the door leaf, regardless of the weather conditions that may affect the outer face (frost, rain, etc.) and regardless of whether or not gloves are worn by the user.

According to one embodiment, the detection area extends over a surface larger than that occupied by the layer of piezoelectric material on the inner face.

This allows detection and identification of contact outside the portion of the outer face that is opposite the layer of piezoelectric material. Thus, this allows adding one or several element(s) for interfacing with the user, such as a screen, in the detection area, near the layer of piezoelectric material.

According to one embodiment, the device comprises a lighting element adjacent to the detection area.

This allows the detection area to be signaled when the user approaches the vehicle.

According to one embodiment, the lighting element comprises a plurality of light sources configured to emit a predetermined light signal with a view to suggesting to the user the execution on the detection area of a predetermined contact.

According to one embodiment, the detection member is glued or overmolded onto the inner face.

According to one embodiment, the device comprises a motor vehicle door handle, and the detection wall forms part of this handle.

According to one embodiment, the handle comprises a grip having an outer side and an opposite inner side, and the detection wall is arranged on the outer side of the handle of the handle.

According to one embodiment, the handle is flush with the body of the vehicle and the detection wall is arranged on the outer side of this handle.

By handle flushing with the body it should be understood that the outer side of the handle, and consequently the detection wall, is at the same level as the surface of the body around the handle. Thus, as seen from the outside, the handle does not form any protrusion or cavity with respect to the body.

According to one embodiment, the device comprises a motor vehicle door post, and the detection wall is incorporated to this post.

According to another aspect, the disclosure relates to a door handle for a motor vehicle incorporating a locking and/or unlocking control device having the aforementioned features.

According to yet another aspect, the disclosure relates to a motor vehicle comprising a locking and/or unlocking device having the aforementioned features.

The device may be part of a door handle. It may alternatively form part of a fixed post of the frame of the vehicle, while being able to be positioned if necessary opposite or near a door leaf handle.

According to another aspect, the disclosure also relates to a method for locking and/or unlocking a motor vehicle door leaf comprising the steps:

- of detecting an authorized user near the vehicle,
- of detecting a predetermined contact on the detection area of a locking and/or unlocking device having the aforementioned features,
- of locking or unlocking the door leaf according to the predetermined contact made by the user.

The step of detecting an authorized user near the vehicle may precede or follow the step of detecting a predetermined contact on the detection area.

Advantageously, the method comprises a step of emitting a visual signal via the lighting element.

This step may follow the step of detecting an authorized user near the vehicle and precede the step of detecting a predetermined contact on the detection area. It is also possible to consider this step occurring after the step of locking or unlocking the door leaf.

BRIEF DESCRIPTION OF THE DRAWINGS

Other features and advantages of the present disclosure will appear clearly from the detailed description hereinafter of an embodiment, provided as a non-limiting example, with reference to the appended drawings in which.

DETAILED DESCRIPTION OF THE DRAWINGS

Figure 1:
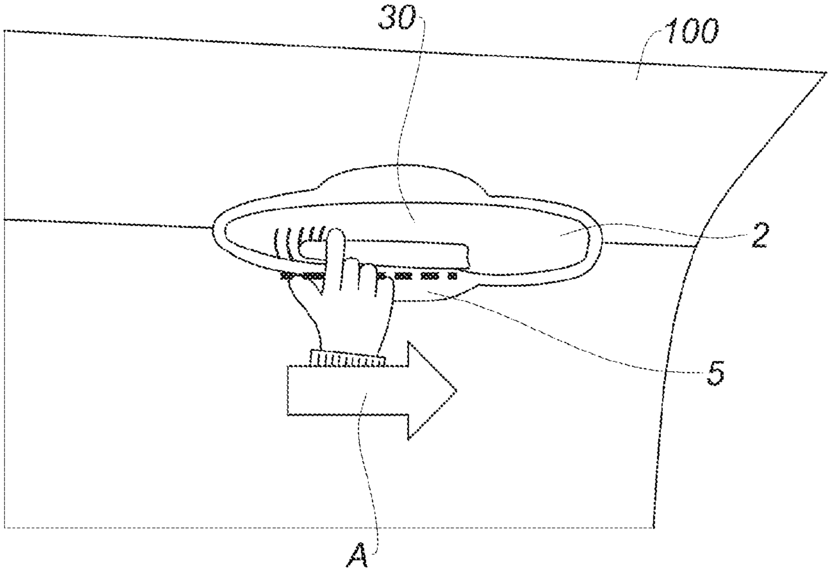
FIG. 1 is a perspective view of a locking and/or unlocking device according to an embodiment of the disclosure, equipping a motor vehicle door leaf.
Figure 2:
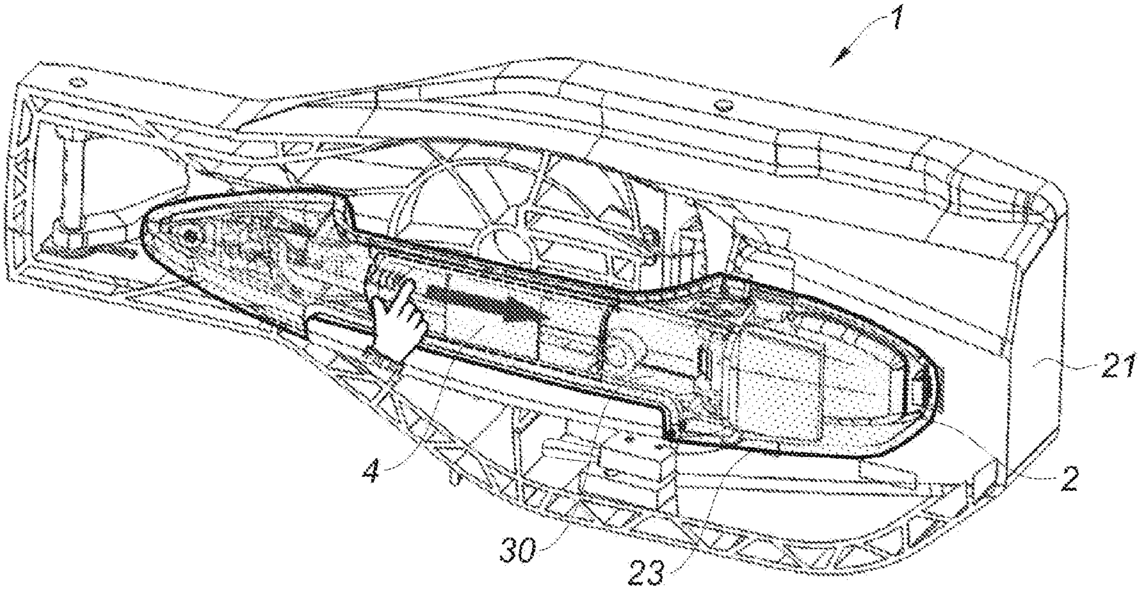
FIG. 2 is a semi-transparent perspective view of a locking and/or unlocking device according to an embodiment of the disclosure, equipping a motor vehicle door leaf.

FIGS. 1 and 2 show a device 1 intended for locking and/or unlocking one or several door lea(f/ves), in particular one or several door(s) 100, of a motor vehicle. According to the embodiment illustrated in FIGS. 1 to 4, the device 1 equips a handle 2 which may be mounted on a door 100 of a vehicle. Alternatively, the locking and/or unlocking device 1 may equip a fixed portion of the vehicle, for example facing a handle 2 with a door leaf.

Figure 4:
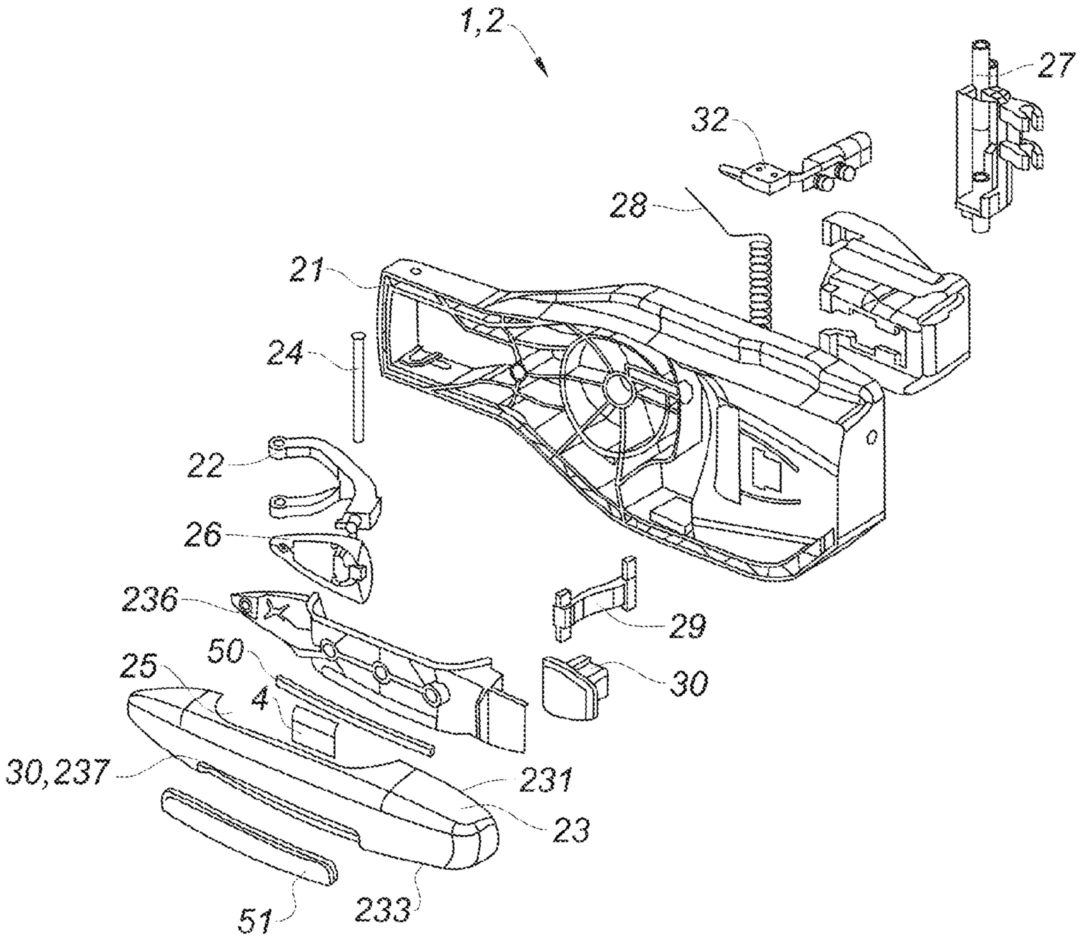
FIG. 4 is an exploded perspective view of a locking and/or unlocking device according to an embodiment of the disclosure, equipping a motor vehicle door leaf.

Referring to FIG. 4, the handle 2 comprises a frame 21 intended to be fixed to the door 100 of the vehicle, as well as a grip 23 connected to the frame 21 and intended to be gripped by a user to open the door 100. The grip 23 delimits with the frame 21 an opening 25 allowing the passage of the fingers of the user. The grip 23 has an internal side 231 facing the frame 21 and delimiting therewith the opening 25 for the passage of the fingers of the user, as well as an external side 233 opposite to the internal side 231. The handle 2, once mounted on the door leaf of the vehicle, may be intended to extend in a horizontal direction. The handle 2 may be made of plastic material and produced by plastic injection.

It should be noted that the locking and/or unlocking device 1 has the advantage of operating with all types of materials, including with materials that are not transparent to waves such as metal, carbon, metallic paint, etc.

In the present application, it should be noted that the front and rear directions are defined with respect to the front and the rear of a motor vehicle. Likewise, the inner/internal, outer/external directions are defined with respect to the center of the vehicle, the inner/internal direction being oriented towards the center of the vehicle, whereas the outer/external direction is oriented away from the center of the vehicle, that is to say towards the outside of the vehicle.

Figure 3:
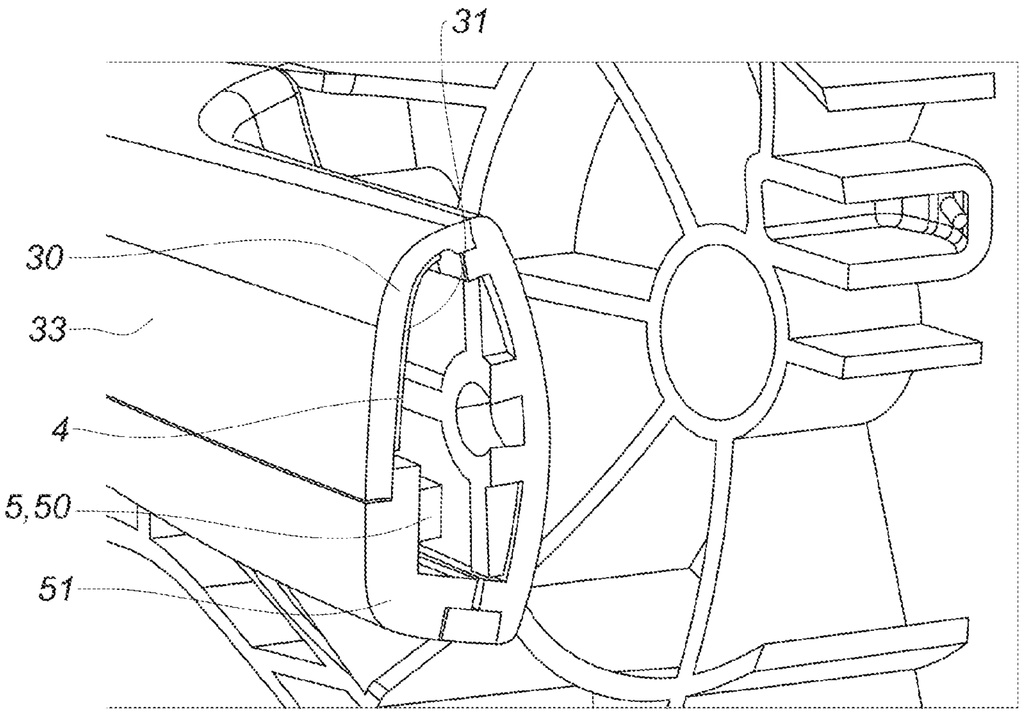
FIG. 3 is a sectional view of the locking and/or unlocking device according to FIG. 2.

As shown in FIGS. 2 to 4, the locking and/or unlocking device 1 comprises a detection wall 30 and a detection member fixed against this detection wall 30.

In the embodiment presented in the figures, this detection wall 30 is a wall of the door handle 2, and more precisely specifically of the grip 23 of the handle 2. Where appropriate, the detection wall 30 is advantageously located on the external side 233 of this grip 23. As shown in FIG. 4, the grip 23 of the handle 2 may be formed of two half-shells attached to one another, including an outer shell 237 and an inner shell 236, the outer shell 237 forming the detection wall 30. Thus, the detection wall 30 is accessible to the user from outside the vehicle. The detection wall 30 may be made of a plastic material, for example of ABS (Acrylonitrile Butadiene Styrene) or of PC-ABS (mixture of Polycarbonate and Acrylonitrile Butadiene Styrene) or else of PMMA (Polymethyl methacrylate). The detection wall 30 may also be made of metal, a carbon-based composite, or else covered or not with a metallic paint, the detection member being configured to operate with materials that are not transparent to waves.

As shown in FIG. 3, the detection wall 30 has an inner face 31 and an opposite outer face 33.

The outer face 33 forms a contact detection area intended to be activated by a finger or a hand of a user in order to control the locking or unlocking of the door. This outer face 33 preferably extends in a longitudinal direction, in particular allowing the user to slide his finger along the detection area, in one direction or the other, in a sweeping movement. In use, the detection area may extend horizontally, so that the user slides his finger forwards or backwards to lock or unlock the vehicle, or vice versa. Other orientations of the detection area relative to the vehicle are however possible. Furthermore, the outer face 33 may or may not be smooth, convex or concave, or flat, painted or not. Preferably, the detection area extends over an upper half of the handle 2.

As shown in FIG. 3, the inner face 31 is intended to support the detection member in order to transmit the vibrations or pressures exerted by the user on the outer face 33.

Figure 5:
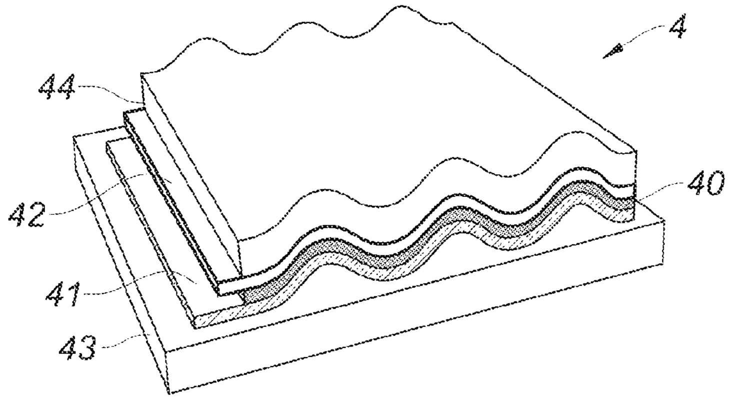
FIG. 5 is a transparent perspective view of the detection member of a device for locking and/or unlocking a motor vehicle door leaf according to an embodiment of the disclosure.

The detection member is fixed against the inner face 31 and comprise a sensor 4 having a layer 40 of a piezoelectric material, for example a ceramic film. The layer 40 of piezoelectric material makes it possible to detect a predetermined contact from among several possible predetermined contacts, with a view to controlling the execution of a predetermined function associated with the detected contact, in particular the locking or unlocking of the door leaf. As illustrated in FIG. 5, the layer 40 of piezoelectric material has surface undulations in the form of ridges on which the pressure transmitted by the detection wall 30 is intended to be exerted when the user presses on the outer face 33. Thus, the detection contact between this piezoelectric layer 40 and the inner face 31 is linear, formed by a plurality of lines corresponding to the ridges or valleys of the undulations. These surface undulations offer a high and discriminating detection sensitivity, so that the sensor 4 makes it possible to detect complex movements, of the "swipe", "single tap" or "double tap" type, that is to say a contact in the form of sliding movement (as well as its orientation) or single or double touch. The sensor 4 may also detect a more or less prolonged pressure by the user on the outer face 33. The sensor 4 is connected for this purpose to an electronic chip (not represented) intended to identify the nature of the movement detected by the ridged piezoelectric layer and consequently send to a central unit of the vehicle a request to execute a function associated with the detected and identified movement, such as locking or unlocking of the vehicle, or lighting of the door handle. The sensor 4 may also detect and annihilate parasitic movements such as actions of cleaning the vehicle, the friction of a branch or even the impact of gravel. Thus, the sensor 4 is configured to detect a predetermined contact from among several possible predetermined contacts with a view to controlling the execution of a predetermined function such as locking or unlocking of the door leaf.

It should also be noted that the detection member is configured to allow detection including with a detection wall 30 that comprises materials that are not transparent to waves.

The structure of the sensor 4 may be similar to that of the sensor described in the application WO 2015/055788.

With reference to FIG. 5, the sensor 4 advantageously comprises at least one electrode 41, 42 made of a conductive material on each side of the piezoelectric layer 40, as well as a substrate 43, for example made of polymer, to support the electrode, piezoelectric layer, electrode stack, and allow handling thereof. Moreover, the sensor 4 may comprise one or several protective layer(s) 44, for example made of polymer material. Thus, according to one embodiment, the sensor 4 has a substrate 43, electrode 41, corrugated piezoelectric layer 40, electrode 42, protective layer 44 stack. Advantageously, it is the substrate 43, herein made of polymer, which is chosen to ensure contact with the inner face 31 of the detection wall 30. In this case, the valleys of the undulations ensure the mechanical continuity.

The sensor 4 is advantageously in the form of a flexible film which may be fixed, for example by gluing or overmolding, on the inner face 31 of the detection wall 30.

The sensor 4 may alternatively be in a rigid form, for example if the substrate is a PCB (standing for "printed circuit board"). In this case, other assembly methods may be considered by any mechanical fastening means such as screws, rivets, etc.

As illustrated in FIG. 2, it should be noted that the detection area, schematically represented in dotted lines, is advantageously larger than the sensor 4. Thus, this detection area extends over a larger surface than that occupied by the sensor 4 on the inner face 31 of the detection wall 30. The sensor 4 therefore detects and identifies contacts of the user with the outer face 33 which may occur not only on the outer face portion 33 behind which the sensor 4 is located, but also on the outer face portions 33 which are near the sensor 4, around it. The detection is more reliable, on the one hand, and on the other hand, it becomes possible to position additional equipment on the outer face 33, in the detection area, next to the sensor 4, such as for example a screen (not represented) for interfacing with the user. As example, the ratio between the surface of the detection area to that occupied by the sensor may range from 1 to 1000, preferably from 10 to 500 and even more preferably from 100 to 500, for example in the range of 300.

With reference to FIG. 3, the device 1 may advantageously comprise a lighting element for emitting a light signal indicating to the user the location of the detection area. The lighting element is arranged near the detection area, for example under the detection wall 30, where appropriate in a lower half of the handle 2. The lighting element may form, with the detection wall 30, the outer half-shell 237 of the handle 2. The lighting element preferably extends parallel to the detection area.

Preferably, the lighting element comprises a plurality of light sources 5, advantageously light-emitting diodes (LED). These light sources 5 are configured to turn on or off independently of each other in order to provide the user with a predetermined visual signal suggesting to him the nature of the movement to be performed on the detection area. For example, with reference to FIG. 1, the light sources 5 light up successively in the direction of the arrow A, towards the rear of the vehicle, to suggest to the user the execution of a sliding movement intended for example to unlock the door leaf. The light sources 5 may also light up together at a predetermined frequency, to suggest a single or double touch movement, or remain turned on for a predetermined time to suggest a more or less prolonged pressure of the finger of the user on the outer face 33 forming the detection area. These light sources 5 may also change color to indicate the correct progress of the action, for example a green color for the unlocked state and a red color for the locked state.

Still in reference to FIG. 3, the lighting element notably comprises a matrix 50 of multiplexed light-emitting diodes accommodated behind protective optics 51 also making it possible to diffuse the light emitted by the light-emitting diodes. The lighting element, more precisely specifically the optics 51, may be fixed by gluing, clipping, screwing or overmolding to the detection wall 30.

The device 1 may also comprise an authorized user detection unit, configured to detect the presence of an authorized user near the vehicle. The authorized user detection unit comprises an on-board system in the vehicle, such as for example an antenna and a radio receiver, and an identifier carried by the authorized user, such as for example a key fob, a terminal such as a smartphone, or a wireless key. Thus, the execution of the unlocking or locking of the door(s) of the vehicle may be subject to the identification of an authorized user near the vehicle.

The locking and/or unlocking device 1 also includes a lock (not represented) movable between a locking position in which the lock keeps the door leaf closed and an unlocking position in which the lock allows the opening of the door leaf.

With reference to FIG. 4, when the locking and/or unlocking device 1 is incorporated in a handle 2, this handle 2 may also comprise all or part of the following features. The handle 2 may thus comprise a pivot connecting element rotatably connecting the grip 23 of the handle 2 and the frame 21. The pivot connecting element may comprise a pin 24 mounted in the frame 21 and a pivot arm 22 connecting the pin to the grip 23 of the handle 2. A sealing member, such as a pivot joint 26, may also be fitted to the handle 2. The handle 2 may comprise a bent lever 27 rotatably mounted relative to the frame 21 and biased by a return element, such as a spring 28, in a rest position. The handle 2 may further comprise an arm 29 rotatably mounted in the grip 23 on the one hand and rotatably mounted relative to the bent lever 27 on the other hand. The pull exerted by the user on the handle 2 of the grip 23 is thus transmitted by means of the rotating arm 29 to the bent lever 27, the rotation of the bent lever 27 allowing the opening of the door. The rotation of the bent lever 27 acts on a cable which in turn acts on the latch, causing opening of the door. In turn, the central unit enables unlocking of the door by sending an instruction to the lock actuator.

The handle 2 may comprise a cap 30 including a latch cylinder enabling unlocking or locking of the door leaf by means of a mechanical key. Thus, the locking and/or unlocking device 1 comprises merely mechanical locking or unlocking a control unit configured to enable locking or unlocking of the door leaf by key, in particular in the event of an electrical failure.

The handle 2 also comprises a micro-switch 32 making it possible to actuate an aid for opening the door, in particular an electric release of the striker of the door, if the latch is of the electromechanical type.

The operation of the locking and/or unlocking device 1 is described hereinafter.

The method for locking and/or unlocking a motor vehicle door leaf may comprise an initial step of detecting a user by means of the authorized user detection unit. This step may be followed by a step of emitting a predetermined visual signal via the lighting element, in order to signal the location of the detection wall 30 and/or suggest to the user the execution of a predetermined contact on this detection wall 30.

The method comprises a step of detecting a predetermined contact on the detection wall 30, by means of the sensor 4.

The electronic chip connected to the sensor 4 identifies the predetermined function, typically locking or unlocking of the door leaf, associated with the type of contact detected, and sends a request to execute this predetermined function to the central unit of the vehicle. To the extent that the user has been identified beforehand as an authorized one, the central unit controls the unlocking or locking of the door, according to the contact movement performed by the user. The user may then pull the handle 2 to open the door.

It should be noted that the method may alternatively start with the step of detecting contact via the detection wall 30 and the sensor 4, then be followed by the step of detecting the authorized user as soon as the central unit receives the request to execute a locking or an unlocking. To the extent that the user is recognized as an authorized one, the central unit may then order the execution of the locking or unlocking. The step of emitting a visual signal by the lighting element may then occur to signal to the user that the locking or unlocking has been completed. In the case of unlocking, the user may then pull the handle 2 to open the door.

Of course, the disclosure is in no way limited to the embodiment described above, this embodiment having been given only as an example. Modifications are still possible, in particular with regards to the constitution of the various elements or by substitution with technical equivalents, yet without departing from the scope of protection of the disclosure.

The invention claimed is:

1. A device for locking and/or unlocking a door leaf of a motor vehicle, the device comprising: a detection wall having an inner face and an outer face disposed opposite said inner face, the outer face forming a contact detection area, and a detection member arranged against the inner face for detecting a contact between a finger or a hand of a user and said outer face, wherein the detection member comprises a sensor having a layer of a piezoelectric material with surface undulations in the form of ridges, said layer of piezoelectric material being configured to detect a predetermined contact on the outer face configured to control, depending on the predetermined detected contact, locking or unlocking of the door leaf.

2. The device according to claim 1, wherein the detection area extends over a surface larger than that occupied by the layer of piezoelectric material on the inner face.

3. The device according to claim 1, wherein the device comprises a lighting element adjacent to the detection area.

4. The device according to claim 3, wherein the lighting element comprises a plurality of light sources configured to emit a predetermined light signal configured to suggest to the user the execution on the detection area of the predetermined contact.

5. The device according to claim 1, wherein the detection member is glued or overmolded onto the inner face.

6. The device according to claim 1, wherein the device comprises a handle for a motor vehicle door, and the detection wall is part of the handle.

7. The device according to claim 6, wherein the handle comprises a grip having an outer side and an opposite inner side, and the detection wall is arranged on the outer side of the grip of the handle.

8. The device according to claim 1, wherein the device comprises a motor vehicle door post, and the detection wall is incorporated to this post.

9. A motor vehicle comprising a locking and/or unlocking device according to claim 1.

10. A method for locking and/or unlocking a door leaf of a motor vehicle the method including the following steps:

detecting an authorized user near the vehicle, detecting a predetermined contact on the detection area of a locking and/or unlocking device according to claim 1, and locking or unlocking the door leaf according to the predetermined contact made by the user.

* * * * *